Aug. 30, 1960    W. P. BAMFORD ET AL    2,950,573
APPARATUS FOR BENDING SHEETS OF GLASS OR THE LIKE
Filed July 16, 1954    2 Sheets-Sheet 1
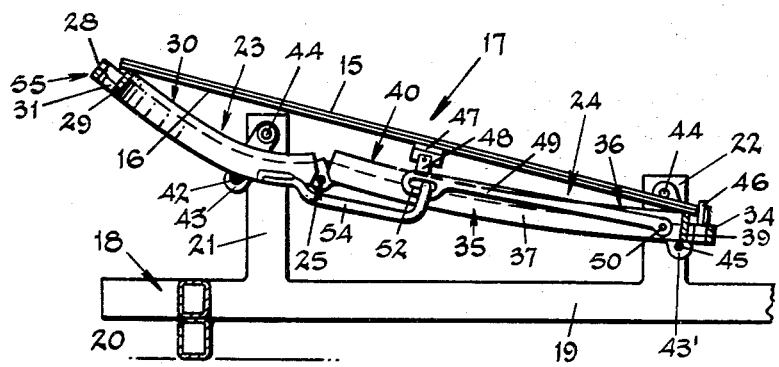
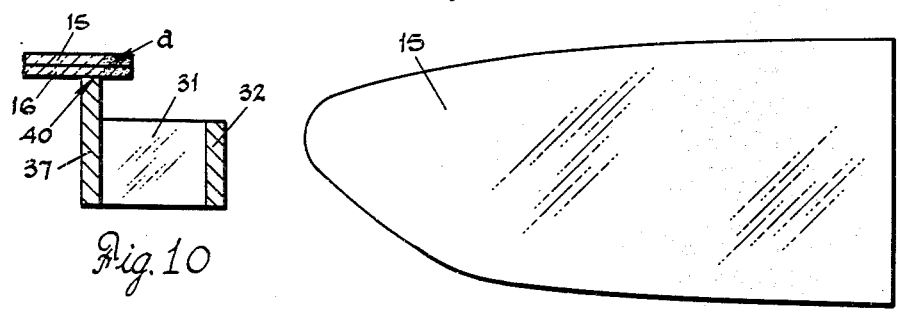
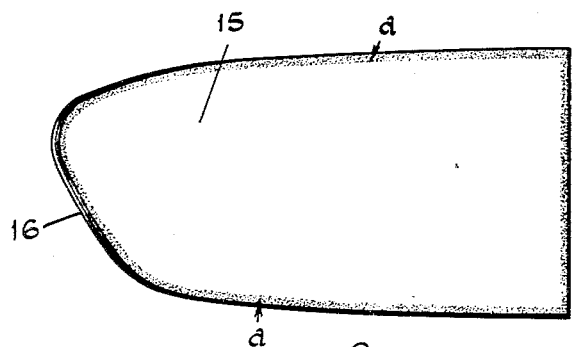
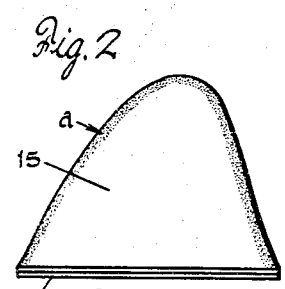
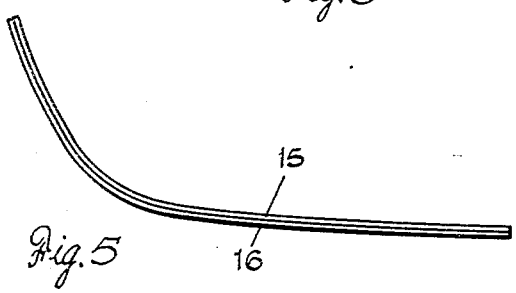
INVENTORS,
WILLIAM P. BAMFORD,
FRANK J. CARSON,
LESLIE H. LAINE
BY Nobbe & Swope
ATTORNEYS Aug. 30, 1960 W. P. BAMFORD ET AL 2,950,573
APPARATUS FOR BENDING SHEETS OF GLASS OR THE LIKE
Filed July 16, 1954 2 Sheets-Sheet 2
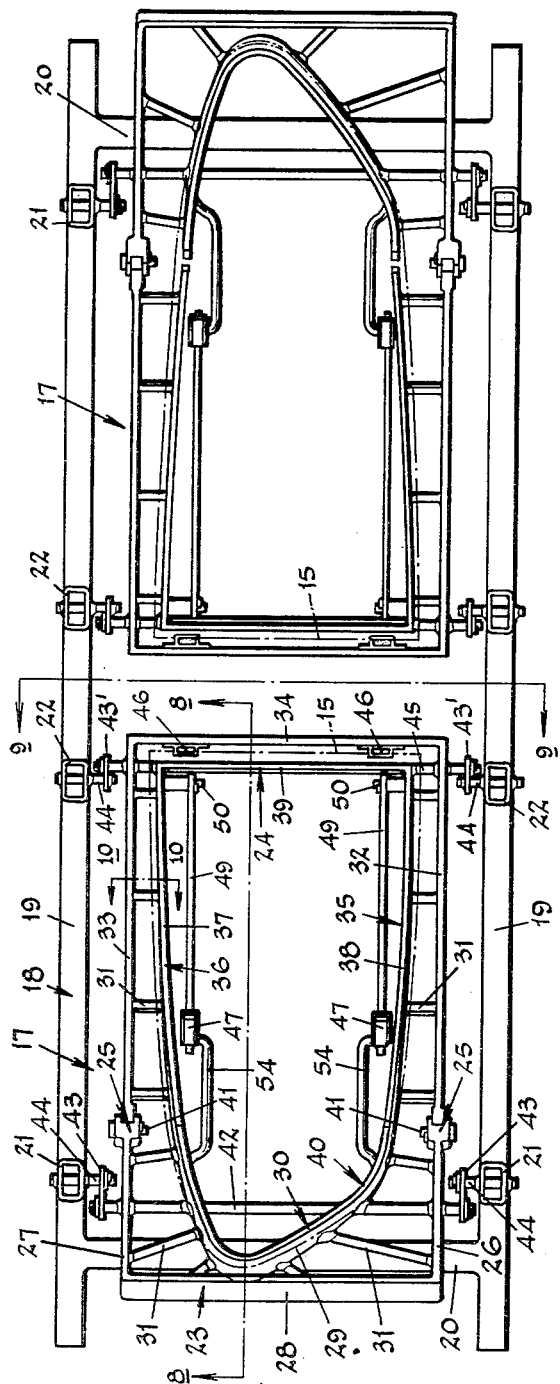
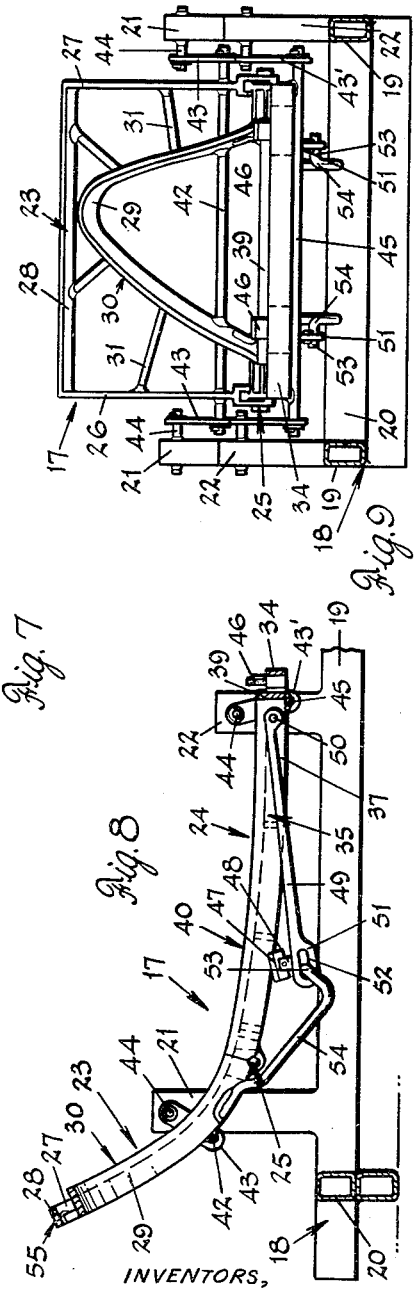
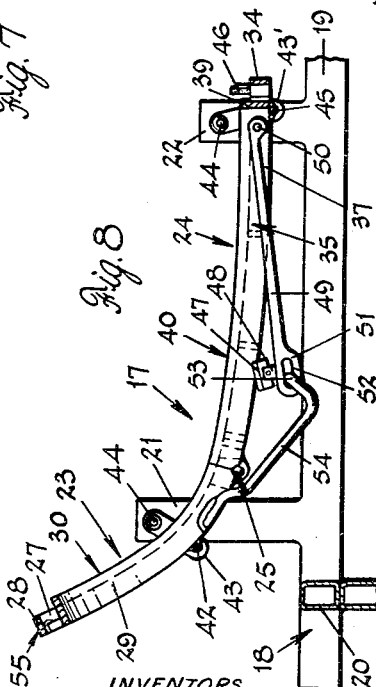
INVENTORS,
WILLIAM P. BAMFORD,
FRANK J. CARSON,
LESLIE H. LAINE
BY Nobbe & Swope
ATTORNEYS United States Patent Office 2,950,573
Patented Aug. 30, 1960

2,950,573

APPARATUS FOR BENDING SHEETS OF GLASS OR THE LIKE

William P. Bamford, Maumee, Frank J. Carson, Toledo, and Leslie H. Laine, Perrysburg, Ohio, assignors to Libbey-Owens-Ford Glass Company, Toledo, Ohio, a corporation of Ohio Filed July 16, 1954, Ser. No. 443,851

5 Claims. (Cl. 49—67)

The present invention relates broadly to the bending of sheets or plates of glass or like materials. More particularly, it has to do with an improved type of apparatus for bending pattern-cut sheets of glass to increase the strength thereof by controlling the orientation or arrangement of their regional strain pattern during bending.

The creation of regional strain, especially in sheet glass, or the resultant patterns thereof, as observed through a polariscope by color filter, has been known to be caused by the influence or close proximity of an adjoining body. Such strains are commonly expressed in terms of "tension" and "compression." It is normally to be expected, in a glass sheet which has been heated, that when such a sheet again cools to room temperature the strains therein will become stabilized. However, where the heating and subsequent cooling of the sheet is carried out on a framework, such as a bending mold, there is an obstruction or local resistance in certain areas to the normally expected or controlled rate of cooling or annealing of the glass.

Thus, in the bending of glass, it has been customary to bring the same to a softened condition within the heated zone of a furnace, cause it to settle onto the supporting or shaping surface of a mold, and then allow the glass to cool or anneal in a controlled zone of gradually reduced temperature but while still retained on said supporting or shaping surface. This is especially true in the case of glass sheets that are to be subsequently laminated together for use as safety glass in automobiles. Laminated or safety glass ordinarily comprises two sheets of glass with an interposed layer of thermoplastic material, such as polyvinyl butyral resin, bonded together under the influence of heat and pressure to form a composite, transparent structure. In such cases, it is customary to bend the two sheets of glass simultaneously or in pairs.

Surprisingly enough, while the existence of regional strain patterns, particularly in glass that has been heated, bent and cooled, has been accepted as an obvious result of the heating and cooling of the glass on the bending mold, it has not generally been known that, by the proper disposition of the glass sheet with respect to the mold surface, the orientation of such strain patterns could be predeterminedly established throughout the body of the sheet. As herein disclosed, this invention has the entire marginal edge portion or perimeter of a glass sheet to be bent in such relation to the mold structure that said marginal edge portion will be permitted to cool uniformly and thus set up therein a continuous band or region of compression, which will result in a structurally stronger edge materially more resistant to spalling, chipping or breakage.

It is, therefore, an important object of this invention to provide an improved apparatus for bending glass sheets in such a manner that the regional strains therein will be produced in accordance with a predetermined pattern.

Another object of the invention is to provide apparatus for bending glass sheets whereby the marginal edge portions of the sheets are unsupported, or out of direct contact with the bending mold after bending to the end that said marginal edge portions can anneal uniformly and set up a resultant continuous outward area of compression.

A further object of the invention is to provide an improved mold for bending pattern-cut glass sheets singly or in pairs wherein the outline of the shaping surface of the mold corresponds to but is relatively smaller than the outline of said sheet or sheets to create a continuous marginal area of substantially uniform width around the bent sheet or sheets that will be subject to a uniform rate of cooling and thereby placed in compression.

Other objects and advantages of the invention will become more apparent during the course of the following description when taken in connection with the accompanying drawings.

In the drawings, wherein like numerals are employed to designate like parts throughout the same:

Figure 1 is a longitudinal sectional view of a mold provided by the invention and showing supported thereon a pair of glass sheets to be bent;

Figure 2 is a plan view of a pair of pattern-cut flat sheets of glass prior to being bent;

Figure 3 is a plan view of the glass sheets after bending and illustrating the regional edge pattern in compression as formed by the apparatus of this invention;

Figure 4 is an end view of the bent glass sheets shown in Figure 3;

Figure 5 is a side elevation of the bent glass sheets shown in Figure 3;

Figure 6 is a fragmentary detail view of a pair of bent glass sheets after laminating and with the regional compression pattern indicated thereon;

Figure 7 is a plan view of a pair of bending molds produced in accordance with this invention;

Figure 8 is a longitudinal sectional view taken substantially on line 8—8 of Figure 7;

Figure 9 is a transverse sectional view taken substantially on line 9—9 of Figure 7; and Figure 10 is a detail section taken substantially on line 10—10 of Figure 7.

The bending apparatus herein disclosed, by way of example, comprises what is commonly termed a ring-type mold having a shaping surface of a curvature corresponding to that to be imparted to the glass. The invention is predicated upon the discovery that during bending of a glass sheet, the strain pattern therein can be oriented or arranged in specific areas of the glass sheet so that predetermined control of the regional strain pattern can be exercised in the bending of the sheet.

The bending of pattern-cut glass sheets is distinguishable from the bending of blank or block size sheets of glass in that certain types of curvatures, together with the length of the glass sheet, renders the bending much more simple and easily accomplished when the sheets are initially cut to the desired outline, which approximates the size and contoured edges of the opening of a car body.

Referring now to the drawings, and particularly to Figure 1, there is shown a pair of flat glass sheets 15 and 16 to be bent placed one upon the other and supported upon a bending mold embodying the present invention and designated in its entirety by the numeral 17. The glass sheets, as illustrated in Figure 2, have been pattern-cut to the desired outline. When two such sheets are combined as an optically matched pair, they may be simultaneously bent on a mold of the type shown in Figure 1 to obtain a curvature as is shown, by way of example, in Figures 3 to 5. However, in accordance with the invention, when the sheets are so bent and, in plan, appear as viewed in Figure 3, the marginal areas thereof, when inspected by a polariscope with color filter, will exhibit a continuous compression region as denoted by the shaded area *a*. In other words, the bent sheets will have a continuous compression strip at and extending along the entire peripheral edge thereof. Inwardly of this compression region, there is a known region in tension and still inwardly throughout the center of the sheets there will be combined or blended areas of tension and compression which appear stabilized in the finally cooled sheets.

It will be apparent that the pair of pattern-cut sheets, after being bent, can be laminated with an interlayer of thermoplastic material, such as polyvinyl butyral resin, to provide a composite safety glass structure such as is shown in Figure 6 and which comprises the two bent glass sheets 15 and 16, with a plastic interlayer *b*. Such a laminated structure may take the form of an automobile windshield, which when viewed through a polariscope with color filter, the marginal edges of the sheets 15 and 16 on opposite sides of the plastic interlayer *b* will disclose continuous marginal areas, as indicated at *a* in Figure 6, that are in compression and thereby structurally stronger and more resistant to breakage.

The bending mold 17, herein shown, is of such shape and size as to produce only one-half of the common two-piece automobile windshield, and therefore molds of this type are customarily mounted in pairs upon a single supporting rack 18 as illustrated in Figure 7. The rack 18 is substantially rectangular in shape and comprises longitudinally extending parallel side members 19, and transverse end members 20 suitably secured to and properly spacing the side members. Generally stated, the molds 17 are of the so-called hinged type and are carried by pairs of uprights 21 and 22 carried by the side members 19 of rack 18 as will be more specifically hereinafter described. Since both molds 17 shown in Figure 7 are of identical construction, a detailed description of only one will be given.

Each mold 17 comprises two joined sections; an upper or end section 23, and a lower or base section 24, connected together at their inner adjacent ends by hinges generally designated 25.

The upper mold section 23 is formed by spaced parallel side bars 26 and 27 connected at their outermost ends by a cross bar 28. Arranged within the confines of the end and side bars is a curved rail 29 having a shaping surface 30 formed on the upper edge thereof and rigidly secured to the end and side bars by means of web members 31.

The base mold section 24 is formed by side bars 32 and 33 connected together at their outer ends by a cross bar 34. Arranged within the confines of the end and side bars is a three-piece rail designated in its entirety by the numeral 35 and having a shaping surface 36 formed on its upper edge. The rail 35 comprises side portions 37 and 38 rigidly secured to the side bars by additional web members 31 and having their ends opposite the hinges 25 connected together by a transverse end portion 39.

The side portions 37 and 38 of the rail 35, carried by the base section of the mold, are substantially a continuation of the rail 29 carried by the upper section so that the two rails 29 and 35 cooperate to form a continuous closed shaping surface designated in its entirety by the numeral 40 and which conforms to the peripheral outline of the flat glass sheets to be bent, but is of a somewhat smaller size so that the marginal edge portions of the sheets project beyond the shaping surface. The glass sheets shown in phantom lines in Figure 7, when bent, as later described, conform to and are supported by the shaping surface 40 of the mold (Figure 7) and have their marginal edge portions *a* extending outwardly therefrom.

As previously mentioned, the upper section 23 and base section 24 are joined by hinges 25, each of the hinges being formed by having the inner ends of the side bars 26 and 27 of upper section 23 bifurcated to respectively receive therein the adjacent ends of the side bars 32 and 33 of base section 24. A pin 41 is passed through axially aligned holes in the component members of each joint and serves as connecting means therebetween.

The upper section 23 is swingably supported by means of a transverse rod 42 rigidly secured to the lower edges of the side bars 26 and 27 and the rail 29. The opposite ends of the rod project beyond the side bars and are rotatably carried in the lower ends of a pair of links 43, each of which is swingably supported at its upper end about a pin 44 fixed in the uprights 21. The base section 24 is pivotally supported by a transverse rod 45 fixedly attached to the transverse end portion 39, with the opposite ends of the rod extending outwardly beyond the side bars and being rotatably supported in the lower ends of a pair of fixed members 43' having their upper ends fixedly supported by pins 44 fixed in the uprights 22.

As shown in Figure 1, when the mold is in its open position the glass sheets 15 and 16 extend outwardly of and are supported at one end by the shaping surface 30 of the upper section 23, and the other end overlaps and is supported by the shaping surface 36 of the base section 24. The lower edge of the sheets 15 and 16 is restrained from downward movement and is located outwardly of the transverse rail portion 39 by locator blocks 46 extending upwardly from the cross bar 34. These blocks are formed of an insulating material such as marinite or graphite and are designed to have no adverse effect on the compression ring extending along the lower edge of the glass sheets. Moreover, prior to bending, the flat sheets are further supported at their periphery midway of their ends by means of a pair of movable blocks 47 of suitable material, such as marinite or graphite, and each of the blocks is vertically pivoted within a yoke 48 carried at the free end of a rod 49 pivotally carried by the base section.

As seen in Figure 7, each of the rods 49 is carried inwardly of the base rail side portions 37 and 38 and is pivotally attached to a dowel 50 extending inwardly therefrom. The end of the rod 49 immediately beneath the block 47 is formed as an elongated ring 51 having formed therein an oblong slot 52 adapted to receive the end portion 53 of a hook shaped member 54 having its opposite end rigidly joined to the innermost edge of the rail 29 carried by the upper mold section 23.

During the opening of the mold 17 to the position of Figure 1, the upper section 23 is swung outwardly while the base section 24 has its innermost end swung upwardly due to the pivotal mounting of the lowermost end thereof so that the overall projected length of the mold is increased, and the blocks 47 are elevated and brought into bearing contact with the under surface of the bottom glass sheet 16. At the same time, the shaping surfaces 30 and 36, which in the closed position of the mold abut each other, are separated as in Figure 1.

More specifically, due to the ends of the rod 42 being rotatably supported within its carrying links 43, the outer end 55 of the upper section 23, carried by the rod, generates an arc downwardly. At the same time, the end of the base section 24, adjacent the hinges 25, is carried upwardly by virtue of its attachment to the adjoining portion of the end section 23, and since the base section is horizontally restrained by the fixed members 43', the upper section is urged outwardly so that the overall projected length of the two sections 23 and 24 is increased. The links 43 carrying the rod 42 conform to the increased length by vertically swinging about their supporting pins 44.

Since the hooked member 54 has its fixed end rigidly attached to the upper section rail 29 inward of the transverse rod 42, it is carried upwardly when the end section is rotated, thereby serving to rotate the pivoted rod 49, having the block 47 carried thereon, about its pivot dowel 50 so as to bring the block into bearing contact with the under surface of the sheet 16. The pivoted nature of the block within its yoke 48 enables it to adjust itself to the plane of the glass.

After the glass sheets to be bent have been positioned on the mold, the weight of the sheets holds the mold in the "open" position of Figure 1. The mold is then placed in a furnace maintained at a temperature sufficient to soften the glass sheets until they settle toward the shaping surface 40. In so doing, the upper section 23 pivoting within the links 43 has its outer end 55 carried upwardly and the hinges 25 move downwardly, thereby bringing the shaping surfaces 30 and 36 again into end contact with one another.

Since the hook member 54 is attached to the rail 29 inwardly of the transverse rod 42, it moves downwardly thereby rotating the rod 49 about its pivot 50 so that the blocks 47 move downwardly beneath the glass sheets and are lowered beneath the shaping surface 40 thereby allowing the glass sheets to settle into conformity therewith.

After the final bending has been accomplished, and the glass sheets have settled into conformity with the shaping surface, the mold is subjected to gradually reduced temperatures so as to uniformly cool the glass sheets. As previously described, the marginal areas *a* of the glass sheets 15 and 16 are located outwardly of the shaping surface of the mold. Therefore, the marginal areas will not be in direct contact with the shaping surface so that the marginal edges will uniformly cool unaffected by the residual heat remaining in the shaping surface. This uniform cooling places the marginal portions in compression and produces a structurally stronger and breakage-resistant continuous edge portion in the sheets.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

We claim:

1. In apparatus for bending glass sheets, a bending mold comprising a movable mold section and another mold section, and movable sheet support means for supporting a glass sheet to be bent intermediate the ends thereof, said sheet support means comprising a sheet support, a support arm having one end connected to said sheet support and the opposite end pivotally connected to said other mold section, and a member having one end rigidly secured to said movable mold section and the opposite end slidably connected to the end of said arm that is connected to said sheet support.

2. In apparatus for bending glass sheets as defined in claim 1, wherein the mold sections comprise spaced rail sections, and the sheet support means is mounted between said spaced rail sections.

3. In apparatus for bending glass sheets, a bending mold comprising a movable mold section and another mold section, and movable sheet support means for supporting a glass sheet to be bent intermediate the ends thereof, said support means comprising an arm pivotally mounted at one end on said other mold section, said arm having an elongated opening formed therein at the other end thereof, a sheet support member carried by said arm, and a member rigidly secured to said movable mold section and slidably receivable within said elongated opening.

4. In apparatus for bending flat glass sheets, an outline type bending mold comprising a plurality of mold sections movably connected together, means for supporting said mold sections for movement from an open position in which unbent sheets are received thereon to a closed position during bending of the sheets, one of said sections being swingably mounted upon the supporting means for movement about a moving axis and another section being pivotally mounted adjacent one end thereof upon said supporting means for movement about a fixed axis, and means operatively connected with said mold sections for supporting the glass sheet intermediate the ends thereof in the open position of the mold and during the bending thereof.

5. The apparatus for bending flat glass sheets as described in claim 21, in which said means includes an arm pivotally mounted on one of said mold sections, and a rod carried by another of said mold sections and engageable with said arm, said arm having means mounted thereon for engaging a glass sheet as it is being bent and gradually lowering it onto the shaping surface of said mold.

References Cited in the file of this patent

UNITED STATES PATENTS

| | | |
|---|---|---|
| 760,959 | Connington | May 24, 1904 |
| 2,518,896 | Jendrisak | Aug. 15, 1950 |
| 2,608,799 | Babcock | Sept. 2, 1952 |
| 2,633,673 | Bamford et al. | Apr. 7, 1953 |
| 2,691,854 | Rugg | Oct. 19, 1954 |
| 2,746,209 | Walters | May 22, 1956 |
| 2,814,164 | Carson et al. | Nov. 26, 1957 |
| 2,869,287 | Bamford | Jan. 20, 1959 |
| 2,871,623 | Marini | Feb. 3, 1959 |

UNITED STATES PATENT OFFICE
CERTIFICATE OF CORRECTION

Patent No. 2,950,573

August 30, 1960

William P. Bamford et al.

It is hereby certified that error appears in the printed specification of the above numbered patent requiring correction and that the said Letters Patent should read as corrected below.

Column 6, line 32, for "claim 21" read -- claim 4 --.

Signed and sealed this 4th day of April 1961.

(SEAL)
Attest: ERNEST W. SWIDER
Attesting Officer

ARTHUR W. CROCKER
Acting Commissioner of Patents